United States Patent [19]
Doi et al.

[11] Patent Number: 6,144,120
[45] Date of Patent: Nov. 7, 2000

[54] STEPPING MOTOR FOR STABLE CONTROL OF POSITION OF DRIVEN BODY

[75] Inventors: Hirofumi Doi; Katsuya Miki; Sotsuo Miyoshi; Masashi Wakisaka, all of Tokyo, Japan

[73] Assignee: Mitsubishi Denki Kabushiki Kaisha, Tokyo, Japan

[21] Appl. No.: 09/340,183

[22] Filed: Jun. 28, 1999

[30] Foreign Application Priority Data

Feb. 5, 1999 [JP] Japan .................................. 11-029287

[51] Int. Cl.⁷ .......................... H02K 37/12; H02K 37/14; H02K 37/00
[52] U.S. Cl. ........................................... 310/49 R; 310/89
[58] Field of Search ................................ 310/37, 36, 191, 310/209, 80, 89, 270, 49 R, 90

[56] References Cited

U.S. PATENT DOCUMENTS

| | | | |
|---|---|---|---|
| 3,626,220 | 12/1971 | Niculescu | 310/77 |
| 3,763,968 | 10/1973 | Noly | 188/171 |
| 4,465,950 | 8/1984 | Guttinger | 310/162 |
| 4,553,056 | 11/1985 | Pfister | 310/80 |
| 5,412,266 | 5/1995 | Okazaki et al. | 310/40 MM |
| 5,718,259 | 2/1998 | Miyake et al. | 137/338 |
| 5,856,718 | 1/1999 | Matsushita et al. | 310/90 |

FOREIGN PATENT DOCUMENTS

| | | |
|---|---|---|
| 8-251856 | 9/1996 | Japan . |
| 9-149621 | 6/1997 | Japan . |

*Primary Examiner*—Clayton LaBalle
*Attorney, Agent, or Firm*—Sughrue, Mion, Zinn, Macpeak & Seas, PLLC

[57] ABSTRACT

A stepping motor is provided with a plate spring for pressing a housing and a rotor against each other. One of the housing and the rotor is provided with a projection. Variations in position, which is inherent in position control by a related art stepping motor, due to lack of a retaining force subsequent to an initial position setting or due to variations in rotating speed of the motor, are eliminated. Thus the motor is suitably used for controlling of the position of, for example, an HID lamp unit.

15 Claims, 8 Drawing Sheets

STEPPING MOTOR FOR STABLE CONTROL OF POSITION OF DRIVEN BODY

BACKGROUND OF THE INVENTION

1. Field of the Invention

The present invention relates in general to stepping motors for use in controlling the position of a driven object and, more particularly, to improvement of a stepping motor that enables the position of a vehicle lamp unit to be suitably controlled with a simple mechanism.

2. Description of the Related Art

FIG. 9 shows a stepping motor according to the related art disclosed in Japanese Laid-Open Patent Application No.9-149621. Referring to FIG. 9, the stepping motor comprises a housing 32, an inner space 33 formed inside the housing 32, a magnetic field generating coil 34 formed along the entirety of the periphery of the inner space, a rotor 35 formed as a piece of permanent magnet facing the magnetic field generating coil 34 and a bearing member 36 for rotatably securing the rotor 35 to the housing 32.

A description will now be given of the operation of the stepping motor according to the related art.

A current is supplied to the magnetic field generating coil 34 so as to generate a magnetic field. The rotor 35 is rotated as a result of repulsion and attraction occurring between the magnetic field and the permanent magnet constituting the rotor 35. When the magnetic field generated by the field magnetic generating coil 34 and that of the permanent magnet interact to produce a magnetically stable condition, the rotor 35 stops rotating.

By allowing a driven object (not shown) to follow the rotation of the rotor 35, the driven object can be controlled to attain positions corresponding to respective angles that the rotor 35 forms in a magnetically stable condition.

Since the stepping motor according to the related art is constructed as described above, a retaining force sufficient to hold the rotor 35 stationary with respect to the housing 32 is not available when the supply of the current is terminated.

There are many factors that cause an object driven by a stepping motor to vary its position. For example, a vehicle lamp unit is subject to such a variation due to a vibration load from the vehicle movement and due to reduction in the magnetic force occurring as a result of an increase in the ambient temperature. Therefore, the vehicle lamp unit cannot be held in a target position without continuously supplying the current to the stepping motor.

Another aspect relating to the related art stepping motor is that it is usually subject to an open loop control. When an open loop control is used to control the position of the driven object, an initializing process should be undertaken in which the motor is rotated in a predetermined direction until the rotor 35 and follower members (i.e. objects driven by the rotor 35) come into contact with a stopper. When such an initial position setting is undertaken, variations are produced in the magnitude of repulsion after the contact. Such variations are caused by differences in rotating speed of the motor when the contact occurs, variations in the hardness of the contacting members, or deformation of the contacting members. Consequently, variations exist in the initial positions of the rotor 35 and those of the driven object after the initial position setting.

Variations in the initial positions and absence of a sufficient retaining force are disadvantageous in that, for example, the vehicle lamp unit cannot be held in a desired position in accordance with the position of the vehicle. This means that, if the lamp unit includes a High Intensity Discharge (HID) lamp, it cannot be properly controlled to prevent a driver on an opposite lane from being dazzled.

FIG. 10 is a graph showing a damping characteristic of a stepping motor according to the related art, in which time is plotted horizontally and positions are plotted vertically. The solid line represents a characteristic for position control and the dotted line represents a characteristic for initial position setting. A maximum amplitude difference $\Delta\theta 1$ is produced between an overshoot and an undershoot when the rotor is rotated one step. A maximum undershoot $\phi 1$ is produced as a result of repulsion after the initial position setting. The magnitude of the maximum undershoot $\phi 1$ affects the variations in the initial positions of the rotor 35 after the initial position setting.

Japanese Laid-Open Patent Application No. 9-149621 discloses a damper construction in which a plate spring 37 is provided adjacent to the rotor 35, on one side of the housing 32 and a fluorine resin annular plate washer 38 is provided on the other side. The rotor 35 is pressed toward the housing 32 via the fluorine resin annular washer 38. It is expected in Japanese Laid-Open Patent Application NO. 9-149621 that the above-described disadvantage is eliminated using the damping capability and the retaining force provided by such a damping construction.

When the lamp unit using an HID lamp is controlled so as to prevent a driver in an opposite lane from being dazzled, the magnitude of resistance to movement, produced by sliding contact, should be properly controlled. Merely disposing an annular washer 38 between the rotor 35 and the housing 32 would not serve the purpose. In Japanese Laid-Open Patent Application No. 9-149621, the annular washer 38 and the rotor 35 are in face contact with each other. The annular washer 38 and the housing 32 are also in face contact with each other. Therefore, the resistance to movement can only be controlled by appropriately selecting a material forming the annular washer 38 or by selecting a substance used in coating the annular washer 38. Work required to control the magnitude of the resistance is extensive and time-consuming. Moreover, selection of an appropriate material that serves the purpose may sometimes be impossible.

SUMMARY OF THE INVENTION

Accordingly, an object of the present invention is to provide a stepping motor in which tile aforementioned disadvantage is eliminated.

Another and more specific object is to provide a stepping motor in which variations in initial position are controlled, the absence of a sufficient retaining power for holding the position of the rotor is successfully dealt with, and in which the resistance to movement, produced by sliding contact, is easily controlled so as to eventually achieve an objective of protecting a motor vehicle driver on an opposite lane from being dazzled by a lamp unit which comprises an HID lamp.

The aforementioned objects can be achieved by a stepping motor for rotating a rotor inside a stator in accordance with a magnitude of current supplied to the stepping motor, comprising: a housing to which the stator is secured; a bearing member for rotatably supporting the rotor with respect to the housing; pressing means provided between the housing and the rotor, for pressing the rotor against the housing; and a projection formed in one of a housing portion pressed against the rotor and a rotor portion pressed against the housing.

Accordingly, a resistance to movement, produced by sliding contact, is preserved between the projection and the housing or between the projection and the rotor, even when the supply of the current is terminated. Thus, a sufficient retaining force for holding the rotor stationary with respect to the housing is available.

Such a stepping motor may be suitably used to control the position of a vehicle lamp unit which entails various factors (such as vibration load caused by vehicle movement, or reduction in magnetic force of a permanent magnet due to an increase in the ambient temperature) which are conducive to variations in position in such a manner that the vehicle lamp unit is held in a target position without continuously supplying a current to the stepping motor. The resistance to movement is available to control the rotating speed within a desired level despite the fact that an open loop control requiring an initial position setting is undertaken. Consequently, variations in the position of the rotor occurring after the initial position setting due to variations in the rotating speed of the rotor when the contact with the stopper occurs.

Since the projection is fixed to the housing or the rotor, the resistance to movement exists only at one of the joint between the projection and the housing or the joint between the projection and the rotor. By controlling the size of an area on the projection that is in contact with the housing or the rotor, a resistance of a desired magnitude is obtained. Since the stepping motor can be designed to have an appropriate resistance, it is ensured that the resistance of an appropriate magnitude is available and a post-fabrication process for controlling the magnitude of the resistance is not required.

Thus, the invention provides an advantage in that variations in the rotor position subsequent to the initial position setting are reduced, and a resistance of a sufficient magnitude for holding the rotor in place is available. This can be suitably used to hold the lamp unit using an HID lamp stationary in such a manner that a driver on an opposite lane is prevented from being dazzled.

In further accordance with the invention, the bearing member supports the rotor in such a manner that the rotor is displaceable in an axial direction of the rotor, and the pressing means presses the rotor in the axial direction.

Accordingly, even when the projection becomes worn, the axis of rotation is prevented from being displaced in a radial direction and thus stable operation of the stepping motor is maintained over a extended period of time.

In further accordance with the invention, the stepping motor further comprises releasing means for releasing a pressure provided by the pressing means.

Accordingly, position control can be performed in a state where a pressure is released. By using the releasing means in combination with the construction where the bearing member supports the rotor so that the rotor is displaceable in an axial direction thereof and where the pressing means presses the rotor in the axial direction, and by releasing the pressure using the releasing means, the axis of rotation of the rotor is prevented from being displaced in a radial direction of the rotor. Thus, stable operation of the stepping motor is maintained in the absence of the pressure.

In further accordance with the invention, the stepping motor further comprises a first sliding member provided between a housing portion and a rotor portion pressed against each other such that the first sliding member is prevented from rotating with respect to one of the housing and the rotor.

Accordingly, even when a combination of materials forming the rotor and the projection does not provide a desired sliding-contact resistance, or when the resistance does not prove stable over an extended period of time, such problems are eliminated by choosing an appropriate material to form the first sliding member. Since the first sliding member is prevented from being rotated with respect to the housing or the rotor, a desired resistance is produced with respect to the projection.

In further accordance with the invention, the pressing means comprises: a coil spring for providing a pressure; and a second sliding member provided one of between the coil spring and the rotor and between the coil spring and the housing, such that the second sliding member is prevented from rotating with respect to one of the housing and the rotor.

Accordingly, even when a combination of materials forming the rotor and the projection does not provide a desired sliding-contact resistance, or when the resistance does not prove stable over an extended period of time, or when the first sliding member does not provide a desired resistance, these problems are successfully resolved by, for example, adjusting the number of turns of the coil spring. Since the second sliding member is prevented from rotating with respect to the housing, a desired resistance is obtained with respect to the projection.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

First Embodiment

Figure 1A:
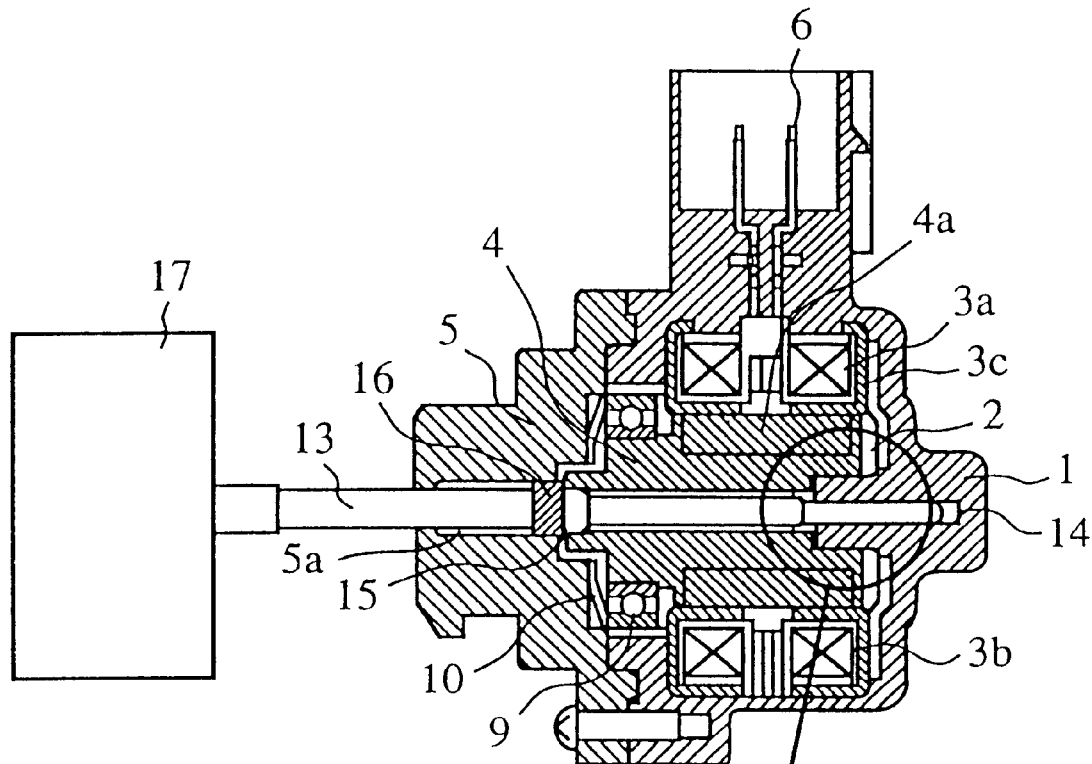
FIG. 1A is a schematic sectional view showing the construction of a stepping motor and an HID lamp unit driven thereby according to a first embodiment of the present invention.
Figure 1B:
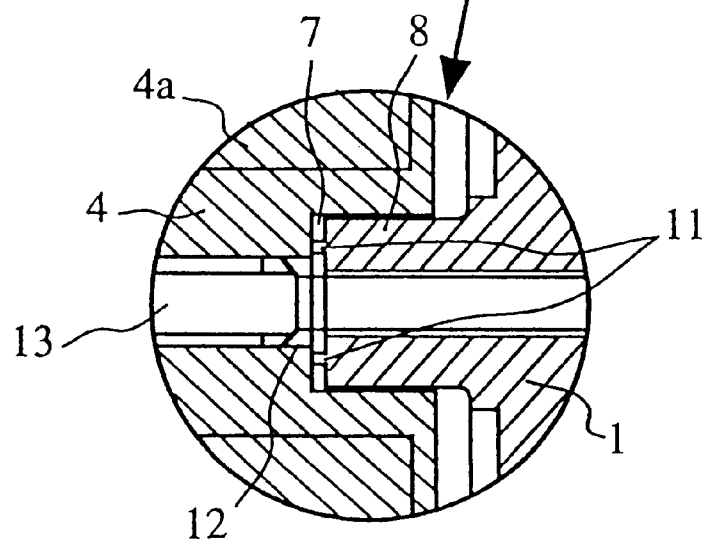
FIG. 1B is a fragmentary sectional view showing a part of the stepping motor according to the first embodiment.
Figure 2:
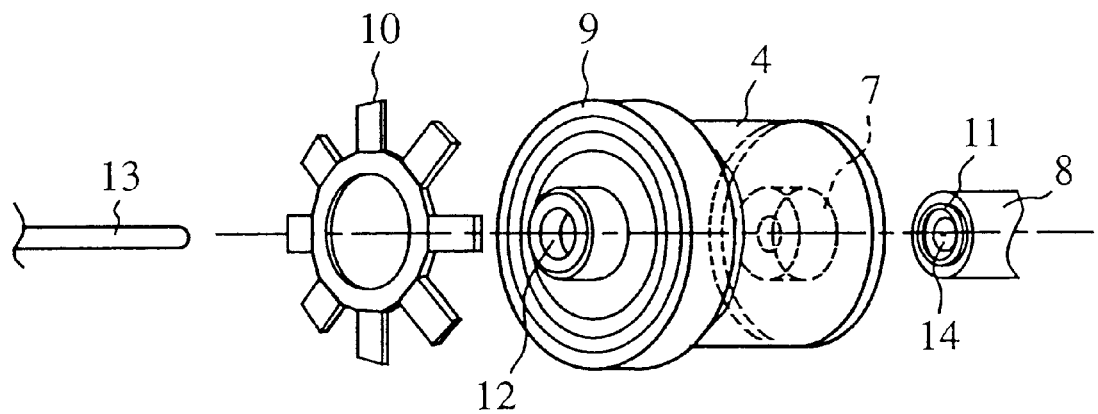
FIG. 2 is an exploded view showing parts of the stepping motor according to the first embodiment.
Figure 3:
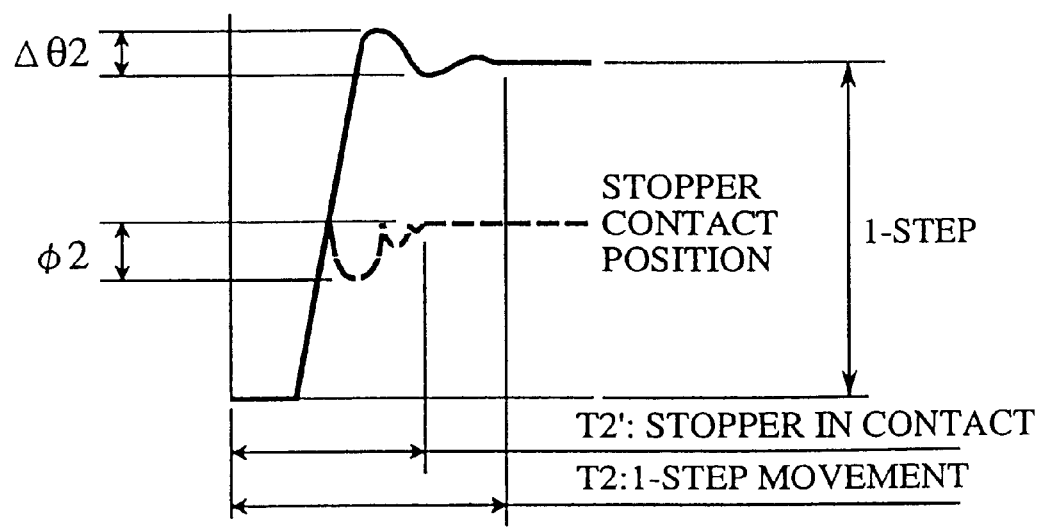
FIG. 3 is a graph showing a damping characteristic of the stepping motor according to the first embodiment.

FIG. 1A is a schematic sectional view showing the construction of a stepping motor and an HID lamp unit driven thereby according to the first embodiment of the present invention. FIG. 1B is a fragmentary sectional view showing a part of the stepping motor according to the first embodiment. FIG. 2 is an exploded view showing parts of the stepping motor according to the first embodiment. FIG. 3 is a graph showing a damping characteristic of the stepping motor according to the first embodiment. Referring to FIGS. 1A, 1B and 2, the stepping motor comprises a housing main body 1 formed, for example, of a molded resin, an opening 2 formed inside the opening 1 so as to be displaced to one side thereof and a magnetic field generating member 3 including a coil 3a, a bobbin 3b and a stator 3c formed to line the periphery of the opening 2, the coil 3a being disposed around the stator 3c so as to generate a magnetic field commensurate with the magnitude of a current supplied to the coil 3a, the bobbin 3b having the coil 3a wound around the bobbin 3b. The stepping motor also comprises a rotor 4 provided interior to the magnetic field generating member 3 and having a plurality of permanent magnets 4a provided at respective locations facing the magnetic field generating member 3, a boss 5 secured to the housing main body 1 so as to cover the entirety of the opening 2 and form a closed space, and a terminal 6 provided at the periphery of the housing main body 1 and supplying a current to the coil 3a.

The stepping motor further comprises a rotor hole (bearing member) 7 formed at an end of the rotor 4 so as to be coaxial with an axis of rotation, an interlocking housing projection 8 formed at the end face of the opening 2 so as to be engaged with the rotor hole 7, a first bearing mechanism member (bearing member) 9 provided between the other end of the rotor 4 and the housing main body 1 so as to rotatably support the rotor 4 with respect to the housing main body 1, a plate spring (pressing means) 10 provided between the boss 5 and the rotor 4, and a annular housing projection 11 (projection part) 11 formed on the end of the housing projection. The rotor hole 7, the interlocking housing projection 8, the first bearing mechanism member 9 support the rotor 8 so as to be displaceable in an axial direction thereof. The pressure provided by the plate spring 10 secures the rotor 4 in its place such that the end face of the rotor 4 facing the rotor hole 7 is in sliding contact with the annular housing projection 11.

The stepping motor further comprises a through hole 12 formed so as to be coaxial with the axis of rotation of the rotor 4 and having a screw thread formed therein, a shaft 13 provided inside the through hole 12, having an end thereof extending from the boss 5 and threaded so as to be engaged in the screw thread of the through hole 12, a shaft hole 14 formed in the housing main body 11 for engaging in the other end of the shaft 13, a rotor side stopper 15 provided in housing main housing main an end of the rotor 4, a shaft stopper 16 formed to accommodate the shaft 13 and preventing the rotation of the shaft 13, and an HID lamp unit 17 connected to an end of the shaft 13.

The through hole 12 may be formed as a metallic buried member embedded in the rotor 4 during the formation of the molded-resin rotor 4. The shaft stopper 16 comes into contact with the inner surface of a hole 5a in the boss 5 such that the rotation of the shaft stopper 16 is prohibited. For example, the shaft stopper 16 may be formed as a rectangular prism and the hole 5a of the boss 5 may have a corresponding rectangular cross section.

A description will now be given of the operation of the stepping motor according to the first embodiment.

As a current is supplied via the terminal 6, the coil 3a generates a magnetic field of an intensity commensurate with the magnitude of the current. Repulsion and attraction occurring between the magnetic field of the coil 3a and that of the permanent magnets 4a cause the rotor 4 to start rotating. The rotor 4 continues to be rotated until a magnetically stable state is induced as a result of an interaction between the magnetic fields. As the rotor 4 is being rotated, the shaft 13 at the center of the rotor 4 is displaced in an axial direction of the rotor 4 by an amount determined by the engagement of the threads, since the rotation of the shaft 13 is prohibited by the shaft stopper 16. As a result, the HID lamp unit 17 connected to the end of the shaft 13 is driven so that the direction of projection of light is changed.

A description will now be given of a position control operation.

At start-up of an engine, a current is supplied for a predetermined period of time to the stepping motor via the terminal 6. As a result, the rotor 4 is rotated for a predetermined period of time and the shaft 13 is moved an associated distance in a rightward direction with reference to FIG. 1A. If, during the predetermined period of time, the shaft stopper 16, integral with the shaft 13, comes into contact with the rotor side stopper 15, the shaft 13 can no longer be moved. Consequently, the shaft 13 is put in an "out-of-control" state. This sequence of events may be used to perform a process known as a initial position setting process. The initial position setting process is performed by supplying a current via the terminal 6 for a predetermined period of time. The position of the shaft 13 at which the shaft stopper 16 comes into contact with the rotor side stopper 15 is determined as an initial position.

When the current supply for the predetermined period of time is over, control may be turned to a second process, hereinafter referred to as a driving process, whereby the position of the HID lamp unit 17 is controlled in a desired manner by supplying a current in accordance with the position of a vehicle or the operating condition of the engine.

Figure 10:
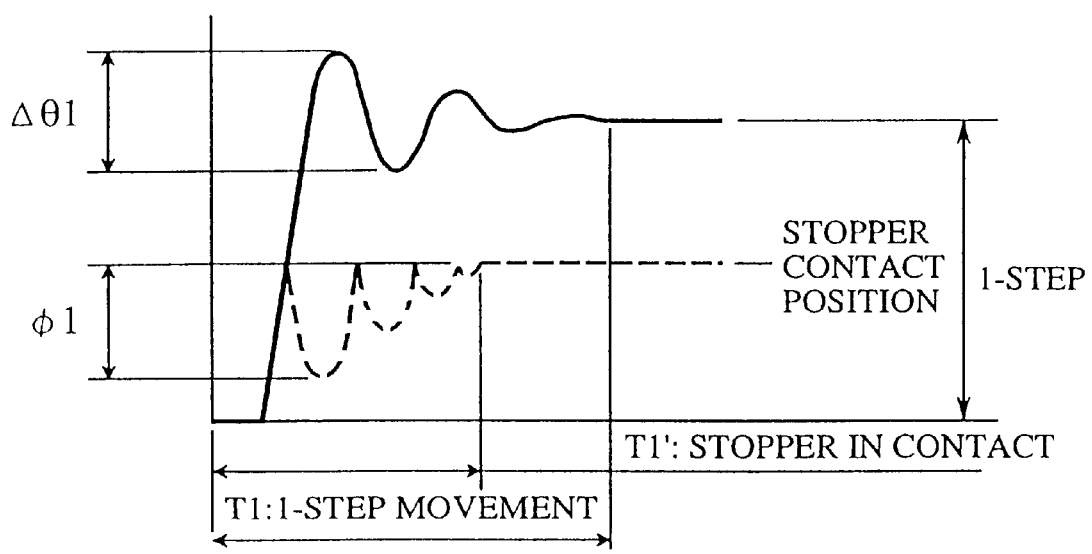
FIG. 10 is a graph showing a damping characteristic of a stepping motor according to the related art.

During the driving process, the pressure provided by the plate spring 10 produces resistance to movement as a result of sliding contact between the annular housing projection 11 and the rotor 4. Thus, even when the supply of the current is terminated subsequent to the driving process, the HID lamp unit 17 is held stationary. As shown in FIG. 3, the magnitude of damping in the initial position setting process and in the driving process can be controlled. Referring to FIG. 3, time is plotted horizontally and positions are plotted vertically. The solid line represents a characteristic for the driving process as measured under the same condition as the related art stepping motor and the dotted line represents a characteristic for the initial position setting as measured under the same condition as the related art stepping motor. A maximum amplitude difference $\Delta\theta 2$ is produced between an overshoot and an undershoot when the rotor according to the first embodiment is rotated one step. A maximum undershoot $\phi 2$ is produced as a result of repulsion after the initial position setting. A comparison with FIG. 10 reveals that $\phi 2$ is smaller than $\phi 1$, proving that the magnitude of variations in initial position of the rotor after the initial position setting are properly controlled.

With the stepping motor constructed as described above, resistance to movement remains between the annular housing projection 11 and the rotor 4, even when the supply of the current is terminated. Thus, a sufficient retaining force for holding the rotor 4 stationary with respect to the housing main body 1 remains available.

Such a stepping motor may suitably used to control the position of a vehicle HID lamp unit 17 which entails various factors (such as vibration load caused by vehicle movement, or reduction in magnetic force of the permanent magnet 4a due to an increase in the ambient temperature) which are conducive to variations in position. The resistance to movement, produced by sliding contact, is available to control the rotating speed of the motor within a desired level, when an open loop control requiring the initial position setting is used. Consequently, it is possible to reduce variations, due to variations in the rotating speed of the rotor 4 prior to the contact with the shaft stopper 16, in position of the rotor 4 after the initial position setting.

Since the annular housing projection 11 is fixed to the housing main body 1, resistance to movement, produced by sliding contact, exists only between the annular housing projection 11 and the rotor 4. By controlling the size of an area on the annular housing projection 11 that is in contact with the rotor 4, a resistance of a desired magnitude is obtained. Since the stepping motor according to the first embodiment can be designed to have an appropriate resistance, it is ensured that the resistance of an appropriate magnitude is available and a post-fabrication process for controlling the magnitude of the resistance is not required.

Thus, the invention provides an advantage in that variations in rotor position subsequent to the initial position setting are reduced, and the resistance of a sufficient magnitude for holding the rotor in place is available. This can be suitably used to hold a lamp unit using a HID lamp stationary in such a manner that a driver on an opposite lane is prevented from being dazzled.

According to the first embodiment, the first bearing mechanism member 9, the rotor hole 7, the interlocking housing projection 8 support the rotor 8 so as to be displaceable in the axial direction thereof. The plate spring 10 presses the rotor 4 in the axial direction thereof. Even when the annular housing projection 11 is worn, the axis of rotation of the rotor 4 is not prevented from being displaced in a radial direction thereof. For an extended period of time, the rotating performance of the stepping motor and the characteristic thereof remain stable, while, at the same time, the above-described effect is preserved.

Figure 4:
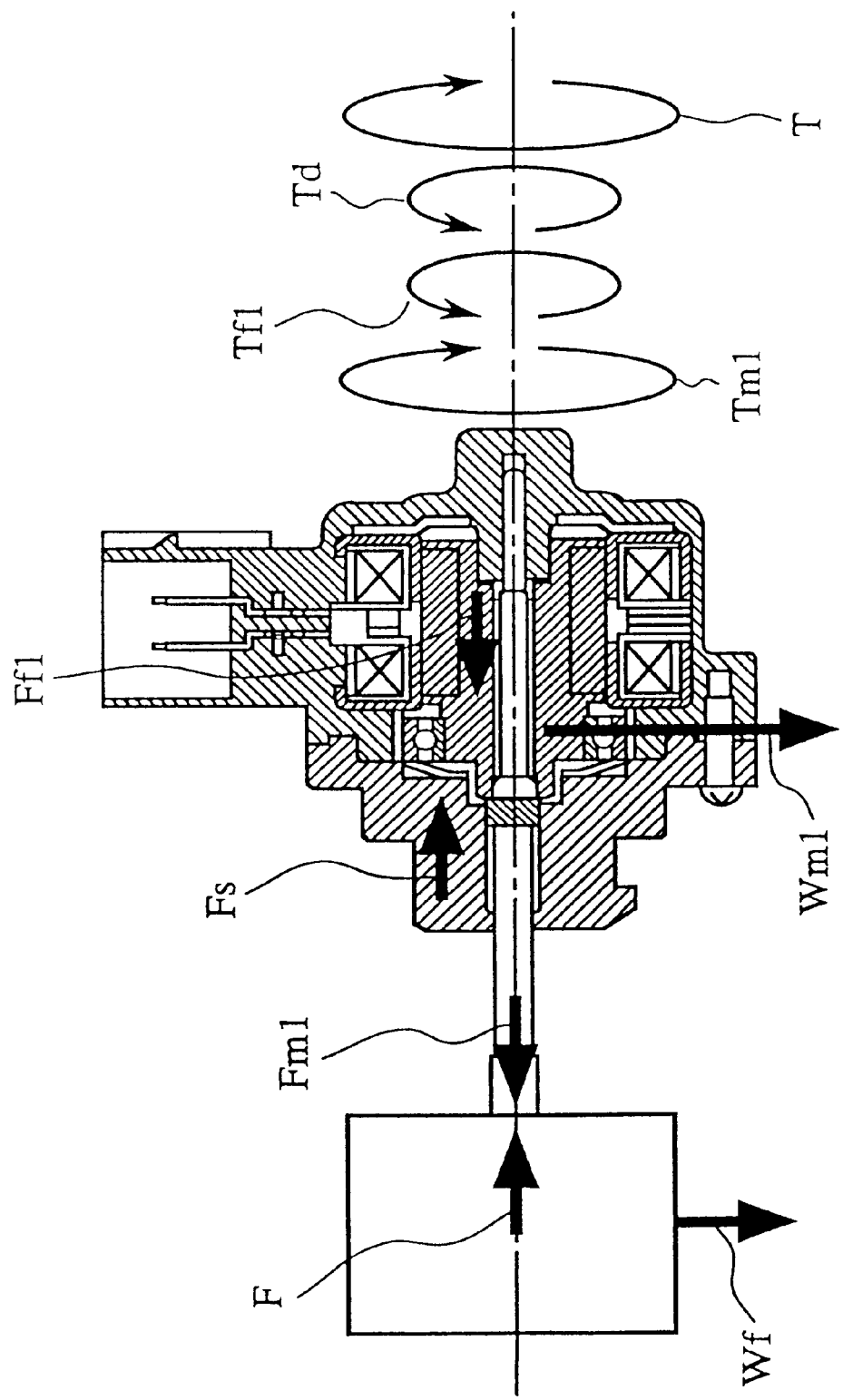
FIG. 4 is an illustration showing different forces acting in the stepping motor according to the first embodiment.

FIG. 4 is an illustration showing different forces acting in the stepping motor according to the first embodiment. Referring to FIG. 4, a friction Ff1 occurs between the annular housing projection 11 and the surface of the rotor 4 that is in sliding contact therewith. The friction Ff1 is given by the equation (1) below, where $\mu 1$ denotes a coefficient of friction, Fs denotes a urging force provided by the plate spring and Rf1 denotes a radius of the surface of the rotor 4 that is in sliding contact with the annular housing projection 11. A torque Tf1 produced by the friction Ff1 is given by the equation (2) below. The torque defines a restriction on rotation according to the invention.

$$Ff1 = \mu 1 \times Fs \quad (1)$$

$$Tf1 = Rf1 \times Ff1 \quad (2)$$

Given that a torque Td resisting the rotation is preserved when the supply of the current is terminated even without the restriction according to the invention, an output torque Tm1 is given by the equation (3), where T denotes a torque theoretically generated by the stepping motor.

$$Tm1 = T - (Td + Tf1) \quad (3)$$

Given that a conversion ratio $\eta$ applies between the thread of the rotor 4 and the thread of the shaft 13 and that the threads have an effective radius Rs, a thrust Fp1 of the stepping motor is given by the following equation (4).

$$Fp1 = Rs \times \eta \times Tm1 \quad (4)$$

A thrust Fm1 required of the stepping motor to drive the HID lamp unit 17 is given by the equation (5) below, where Wf denotes a weight of the HID lamp unit 17, Wm1 denotes a weight of the movable member in the stepping motor including the rotor 4 and the shaft 13, G denotes a vibrational acceleration applied to the movable member and the HID lamp unit 17 and F denotes a load required to drive the HID lamp unit 17.

$$Fm1 > [(Wf + Wm1) \times G + F] \quad (5)$$

If the equations (1) through (5) are taken together, the stepping motor should be designed so as to satisfy the equation (6) below.

$$[(Wf + Wm) \times G + F] < Rs \times \eta \times [T - (Td + Rf1 \times \mu 1 \times Fs)] \quad (6)$$

The value $Rf1 \times \mu 1 \times Fs$ represents the restriction on rotation according to the invention, that is, a torque, provided by the friction between the rotor 4 and the annular housing projection 11. The restriction $Rf1 \times \mu 1 \times Fs$ adds to the torque Td which exists in the absence of the restriction according to the invention. While the restriction $Rf1 \times \mu 1 \times Fs$ subtracts from the thrust of the stepping motor when the current is supplied, it does not present a problem as long as the equation (6) is satisfied.

Second Embodiment

Figure 5A:
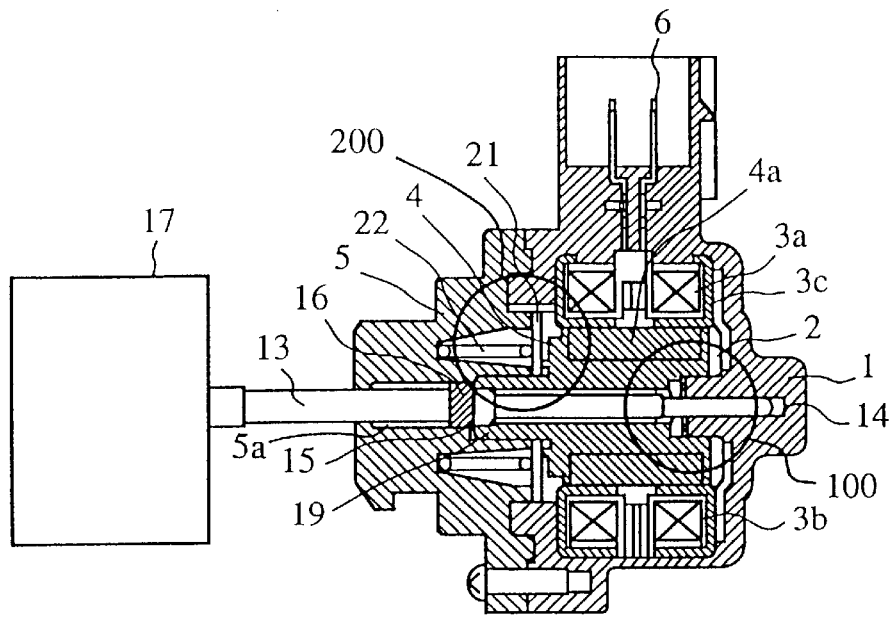
FIG. 5A is a schematic sectional view showing the construction of the stepping motor and the HID lamp unit according to a second embodiment of the present invention.
Figure 5B:
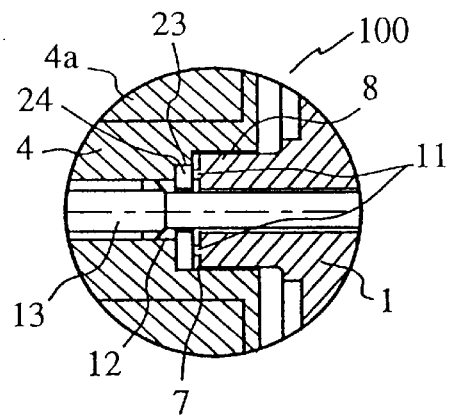
FIG. 5B is a fragmentary sectional view showing a part of the stepping motor according to the second embodiment.
Figure 5C:
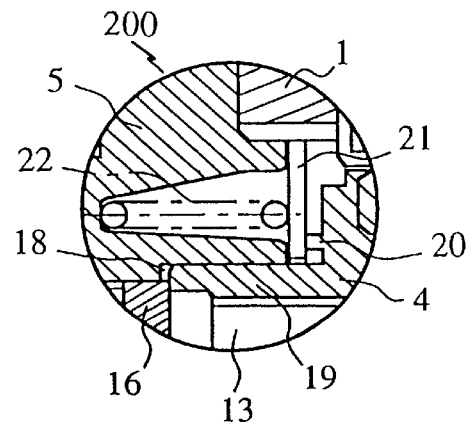
FIG. 5C is a fragmentary sectional views showing another part of the stepping motor according to the second embodiment.
Figure 6:
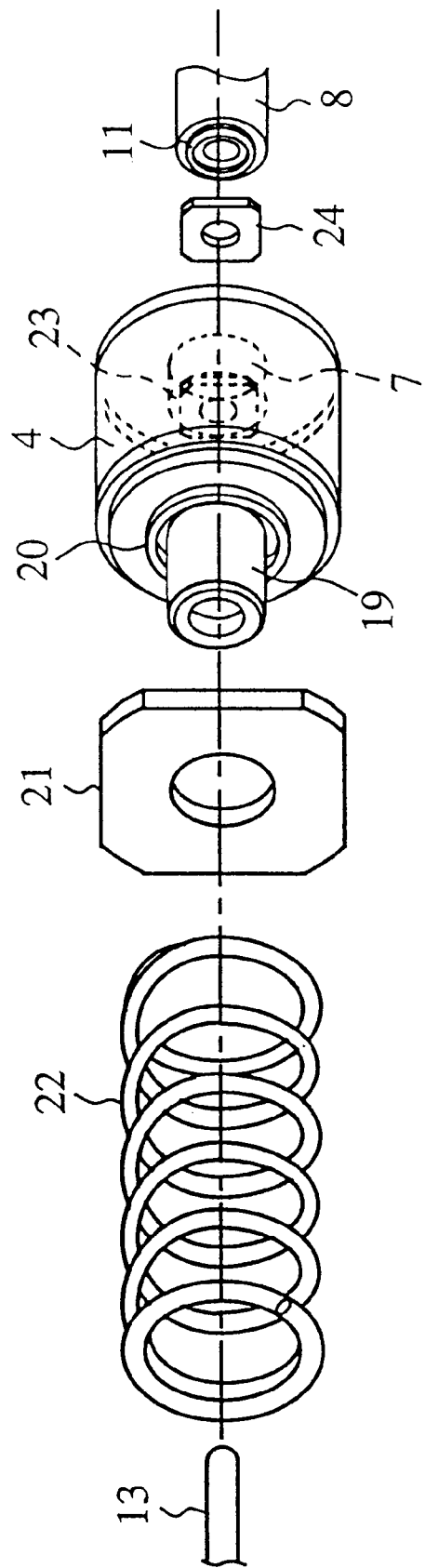
FIG. 6 is an exploded view showing parts of the stepping motor according to the second embodiment.

FIG. 5A is a schematic sectional view showing the construction of the stepping motor and the HID lamp unit according to the second embodiment of the present invention. FIG. 5B is a fragmentary sectional view showing a part 100 of the stepping motor according to the second embodiment. FIG. 5C is a fragmentary sectional views showing a part 200 of the stepping motor according to the second embodiment. FIG. 6 is an exploded view showing parts of the stepping motor according to the second embodiment. Referring to FIGS. 5A, 5B and 5C, the stepping motor comprises an additional housing hole 18 (bearing member) formed in the boss 5 so as to be contiguous with the opening 2 and coaxial with the axis of rotation of the rotor 4, a rotor projection (bearing member) 19 formed in the rotor 4 so as to be adjacent to the boss 5 and engaging in the additional housing hole 18, and an annular rotor projection 20 formed around the rotor projection 19.

The stepping motor further comprises a second sliding member (pressing means) 21 provided between the rotor projection 20 and the boss 5 as a rectangular plate secured to the housing main body 1 and a coil spring 22 provided in a contracted state between the second sliding member 21 and the boss 5.

The stepping motor further comprises a substantially rectangular recess 23 formed at the bottom of the rotor hole 7 and a substantially rectangular first sliding member 24 fitted in the recess 23.

The other aspects of the stepping motor according to the second embodiment are the same as the corresponding aspects of the first embodiment so that the description thereof is omitted.

The first sliding member 24 of the second embodiment, accommodated in the recess 23 at the bottom of the rotor hole 7 of the rotor 4, provides an interface between the annular housing projection 11 and the rotor 4. Thus, even when a combination of materials forming the rotor 4 and the annular housing projection 11 does not provide a desired sliding-contact resistance, or when the resistance does not prove stable over an extended period of time, such problems are eliminated by choosing an appropriate material to form the first sliding member 24.

An added benefit from the use of the sliding member 24 is that, since the first sliding member 24 is prevented from rotating with respect to the rotor 4, a desired resistance with respect to the annular housing projection 11 is obtained.

Another aspect of the second embodiment is that the second sliding member 21 is prevented from rotating with respect to the housing main body 1.

Even with the first sliding member 24, a desired resistance may not be available, or a combination of the materials forming the boss 5, the housing main body 1 and the rotor 4 may fail to produce an appropriate resistance, or the resultant resistance may not prove stable. All of these problems may successfully resolved by, for example, adjusting the number of turns of the coil spring 22, or appropriately selecting the material of the second sliding member 21, or modifying the size of an area of the annular rotor projection 20 which is in contact with the second sliding member 21.

An added advantage is that, since the second sliding member 21 is prevented from rotating with respect to the housing main body 1, a desired resistance is obtained with respect to the annular rotor projection 20.

By forming the first sliding member 24 as a metallic plate such as a stainless steel plate having a relatively small surface coarseness, variations in resistance, due to displacement or deformation of the rotor 4 caused by an error in a resin mold process for forming the housing main body 1 and the rotor 4, are successfully controlled.

When the resin housing main body 1 and the resin rotor 4 are pressed together, the resultant resistance caused by friction may be so large that wear is likely to occur. Forming the first sliding member 24 as a metallic plate resolves such a problem. With this, resistance to movement that proves stable over an extended period of time is available even when the housing main body 1, the boss 5 and the rotor 4 are formed as a resin material.

Similarly, by forming the second sliding member 21 as a metallic plate such as a stainless steel plate having a relatively small surface coarseness, the coil spring 22 is prevented from eroding the resin rotor 4. In this way, resistance to movement that proves stable over an extended period of time is available even when the housing main body 1, the boss 5 and the rotor 4 are formed as a resin material.

Figure 7:
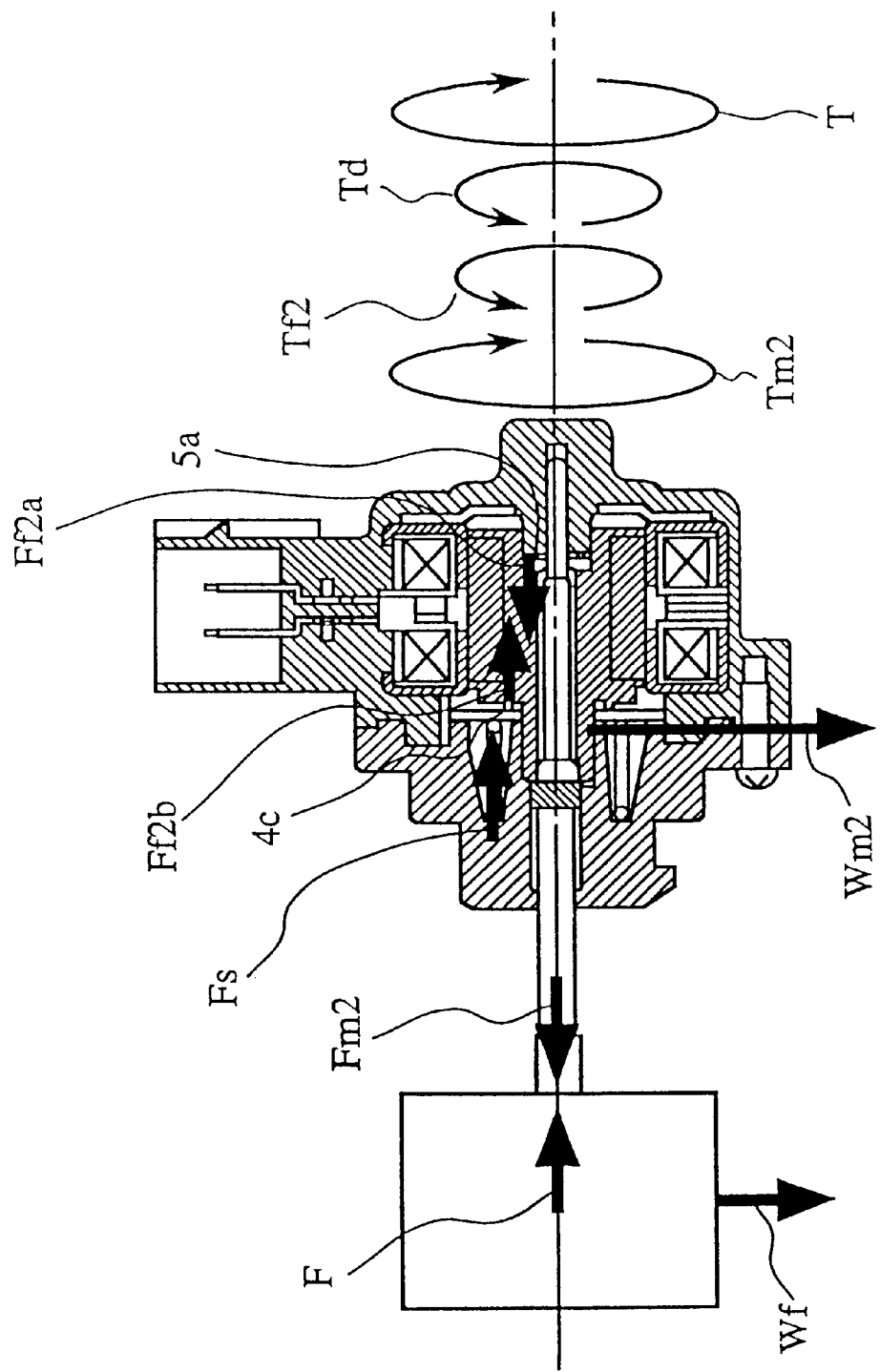
FIG. 7 is a schematic illustration showing forces acting in the stepping motor according to the second embodiment.

FIG. 7 is a schematic illustration showing forces acting in the stepping motor according to the second embodiment. Referring to FIG. 7, an analysis similar to the one applied to the first embodiment results in the equation (7), where Wm2 denotes a weight of movable members in the stepping motor including the rotor 4 and the shaft 13, Rf2a denotes an effective radius of the annular housing projection 11 in sliding contact with the first sliding member 24, $\mu 2a$ denotes a coefficient of friction between the first sliding member 24 and the annular housing projection 11, Rf2b denotes an effective radius of the annular rotor projection 20 in sliding contact with the second sliding member 21 and $\mu 2b$ denotes a coefficient of friction between the second sliding member 21 and the annular rotor projection 20.

$$[(Wf+Wm2) \times G + F] < Rs \times \eta \times [T - [Td + (Rf2a \times \mu 2a + Rf2b \times \mu 2b) \times Fs)] \quad (7)$$

The surface coarseness and the material of the first sliding member 24 and the second sliding member 21 may be appropriately modified so as to control the friction Ff2a and Ff2b. In this way, a more extensive control than available in the first embodiment is available in setting a balance between the thrust of the stepping motor and the retaining force occurring when an electric current is absent.

Third Embodiment

Figure 8:
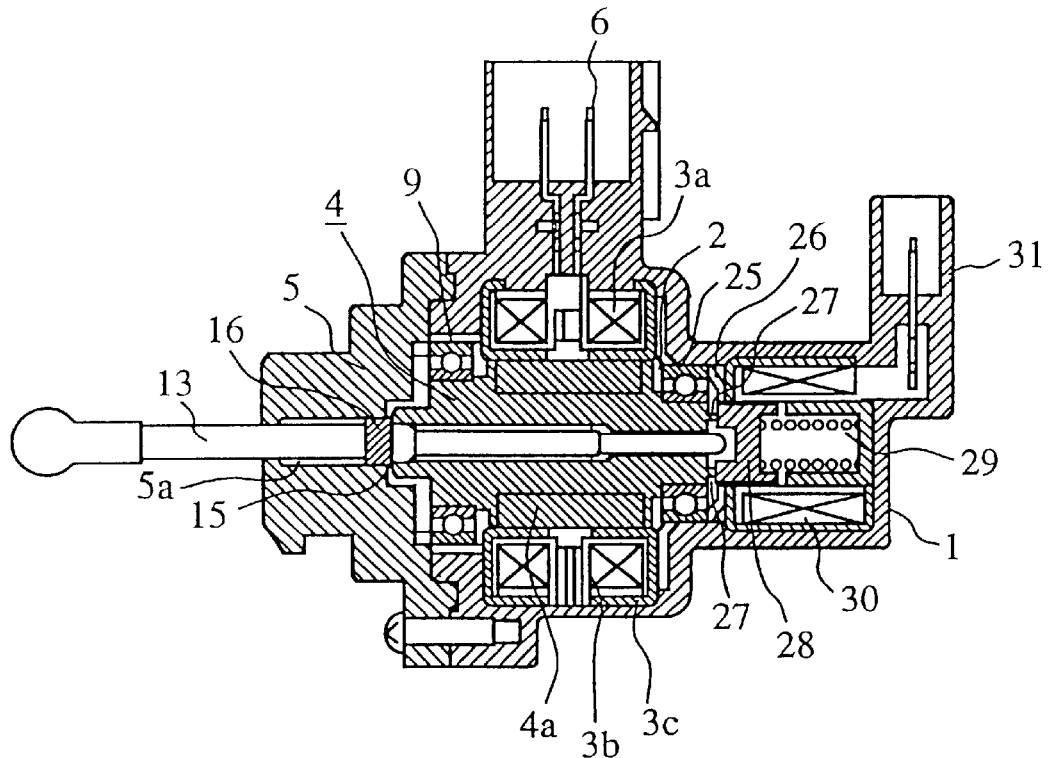
FIG. 8 is a schematic sectional view showing the construction of the stepping motor according Lo a third embodiment.
Figure 9:
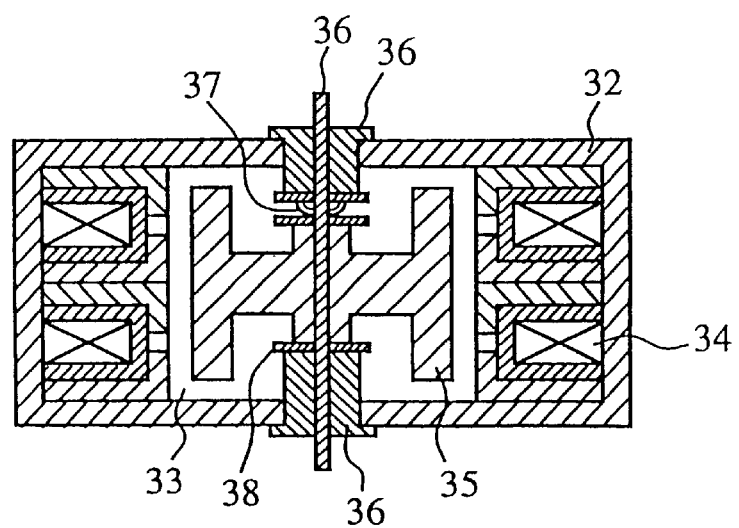
FIG. 9 shows a stepping motor according to the related art.

FIG. 8 is a schematic sectional view showing the construction of the stepping motor according to the third embodiment. The stepping motor comprises a second bearing mechanism member (bearing member) 25 provided between an end of the rotor 4 and the housing main body 1 for supporting the rotor 4 with respect to the housing main body 1, and a plate spring 26 provided between the second bearing mechanism member 25 and the housing main body 1. Thus, the rotor 4 is supported around its axis of rotation and, moreover, the pressure provided by the plate spring 26 secures the rotor 4 in its position where the rotor 4 and the boss 5 are pressed against each other via the first bearing mechanism member 9.

The stepping motor further comprises an annular rotor projection (projection) 27 formed on one side of the plate spring 26 of the rotor 4, a second sliding member (pressing means) 28 provided between the annular rotor projection 27 and the housing main body 1 and formed as a substantially rectangular plate of a magnetic material such that the second sliding member 28 is prevented from rotating with respect to the housing main body 1 and displaceable in the axial direction of the rotor 4. Numeral 29 indicates a coil spring provided in a compressed state between the second sliding member 28 and the housing main body 1. With this, an appropriate resistance to movement due to sliding contact is obtained as a result of the pressure provided by the coil spring 29 and friction between the second sliding member 28 and the annular rotor projection 27.

The stepping motor further comprises a releasing coil (releasing means) 30 formed to line the periphery of the opening 2 at a distance from the stator 3c. The releasing coil 30 generates a magnetic field having a magnitude commensurate with the current applied thereto. Numeral 31 indicates a releasing terminal (releasing means) provided on a periphery of the housing main body 1 so as to supply a current to the releasing coil 30.

A description will now be given of the operation of the stepping motor according to the third embodiment.

When a current is supplied to the terminal 6 subsequent to the initial position setting, the releasing terminal 31 is also supplied with a current. In response to this, a magnetic field is generated by the releasing coil 30. The attraction that occurs between the magnetic field of the releasing coil 30 and the second sliding member 28 causes the second sliding member 28 to be removed from the annular rotor projection 27. Accordingly, the driving process is performed without the pressure provided by the coil spring 29 being in effect. Resistance to movement due to sliding contact between the second sliding member 28 and the annular rotor projection 27 is no longer available so that the driving capability of the stepping motor is fully utilized to set the position of the rotor 4. When the initial position setting is undertaken or when the position is to be held, restriction on rotation, i.e. a damping force, due to resistance to movement provided by the coil spring 29 is readily available.

The other aspects of the third embodiment are the same as the corresponding aspects of the first embodiment, and the description thereof is omitted.

Thus, by releasing the pressure when the position of the rotor is controlled subsequent to the initial position setting, the driving capability of the stepping motor is fully utilized for position control.

Particularly, it is to be noted that, according to the third embodiment, the first bearing mechanism member 9 and the second bearing mechanism member 25 cooperate to prevent the rotor 4 from being displaced in the radial direction, and the coil spring 29 presses the rotor 4 in the axial direction of the rotor 4. Thus, even when the pressure is released, the axis of rotation of the rotor 4 is prevented from displaced in the radial direction thereof. Thus, the pressure can be released without affecting the stable rotation of the rotor.

While the description of the foregoing embodiments have been given on an assumption that the cross section of the projections 11, 20 and 27 is rectangular, other configurations including a substantially semicircular configuration and a substantially semi-elliptic configuration produce the same effects.

The present invention is not limited to the above-described embodiments, and variations and modifications may be made without departing from the scope of the present invention.

What is claimed is:

1. A stepping motor for rotating a rotor inside a stator in accordance with a magnitude of current supplied to the stepping motor, comprising:
    a housing to which the stator is secured;
    a bearing member for rotatably supporting the rotor with respect to said housing;
    pressing means provided between said housing and the rotor, for pressing the rotor against said housing; and
    a projection formed offset from and extending circumferentially of an axis of rotation of the rotor in one of a housing portion pressed against the rotor and a rotor portion pressed against said housing.

2. The stepping motor according to claim 1, wherein said bearing member supports the rotor in such a manner that the rotor is displaceable in an axial direction of the rotor, and the pressing means presses the rotor in the axial direction.

3. The stepping motor according to claim 1, further comprising releasing means for releasing a pressure provided by said pressing means.

4. The stepping motor according to claim 1, further comprising a shaft provided at an axial center of the rotor so as to be movable in an axial direction of the rotor.

5. A stepping motor for rotating a rotor inside a stator in accordance with a magnitude of current supplied to the stepping motor, comprising:
    a housing to which the stator is secured;
    a bearing member for rotatably supporting the rotor with respect to said housing;
    pressing means provided between said housing and the rotor, for pressing the rotor against said housing;
    a projection formed in one of a housing portion pressed against the rotor and a rotor portion pressed against said housing; and
    a first sliding member provided between a housing portion and a rotor portion pressed against each other such that said first sliding member is prevented from rotating with respect to one of said housing and the rotor, while pressed against and rotating with respect to said projection.

6. A stepping motor for rotating a rotor inside a stator in accordance with a magnitude of current supplied to the stepping motor, comprising:
    a housing to which the stator is secured;
    a bearing member for rotatably supporting the rotor with respect to said housing;
    pressing means provided between said housing and the rotor, for pressing the rotor against said housing, comprising:
        a coil spring for providing pressure; and
        a sliding member provided one of between said coil spring and the rotor and between said coil spring and said housing, such that said sliding member is prevented from rotating with respect to one of said housing and the rotor, while pressed against and rotating with respect to said projection; and
    a projection formed in one of a housing portion pressed against the rotor and a rotor portion pressed against said housing.

7. A stepping motor comprising:
    a stator;
    a housing to which the stator is secured;
    a rotor, rotatably supported inside said stator;
    a contact surface which is disposed between said rotor and said housing;
    a projection extended toward said contact surface, formed offset from and circumferentially of an axis of rotation of said rotor;
    an elastically resilient member in compression, generating force in an axial direction of said rotor, creating pressure between a portion of said projection and said contact surface; and
    a friction interface with a predetermined surface area, between said portion of said projection and said contact surface.

8. The stepping motor according to claim 7, wherein said contact surface is a surface portion of said rotor, and wherein said projection extends from a surface of said housing.

9. The stepping motor according to claim 7, wherein said contact surface is a surface portion of said housing, and wherein said projection extends from a surface of said rotor.

10. The stepping motor according to claim 7, wherein said rotor is displaceable in the axial direction of the rotor, relative to said housing.

11. The stepping motor according to claim 7, wherein said contact surface is rotationally static relative to a rotation of said rotor, and said projection extends toward said contact surface from a surface which is rotationally static relative to said housing.

12. The stepping motor according to claim 7, wherein said contact surface is rotationally static relative to a rotation of said housing, and said projection extends toward said contact surface from a surface which is rotationally static relative to said rotor.

13. A stepping motor comprising:
    a stator:
    a housing to which the stator is secured;
    a rotor, rotatably supported inside said stator;
    a contact surface which is disposed between said rotor and said housing;
    a projection extended toward said contact surface;
    an elastically resilient member in compression, generating force in an axial direction of said rotor, creating pressure between a portion of said projection and said contact surface, and including first and second pressure points, one at each end of said elastically resilient member relative to the axial direction of the rotor;
    a friction interface with a predetermined surface area, between said portion of said projection and said contact surface;

a metallic member subject to magnetic attraction abutting said first pressure point and displaceable in the axial direction of said rotor; and an electromagnetic abutting said second pressure point, said electromagnet generating magnetic force when current is applied, attracting said metallic member and further compressing said elastically resilient member.

14. The stepping motor according to claim 13, wherein said projection extends from a surface of said metallic member.

15. The stepping motor according to claim 13, wherein said contact surface is a portion of said metallic member.

* * * * *